Patented Oct. 28, 1924.

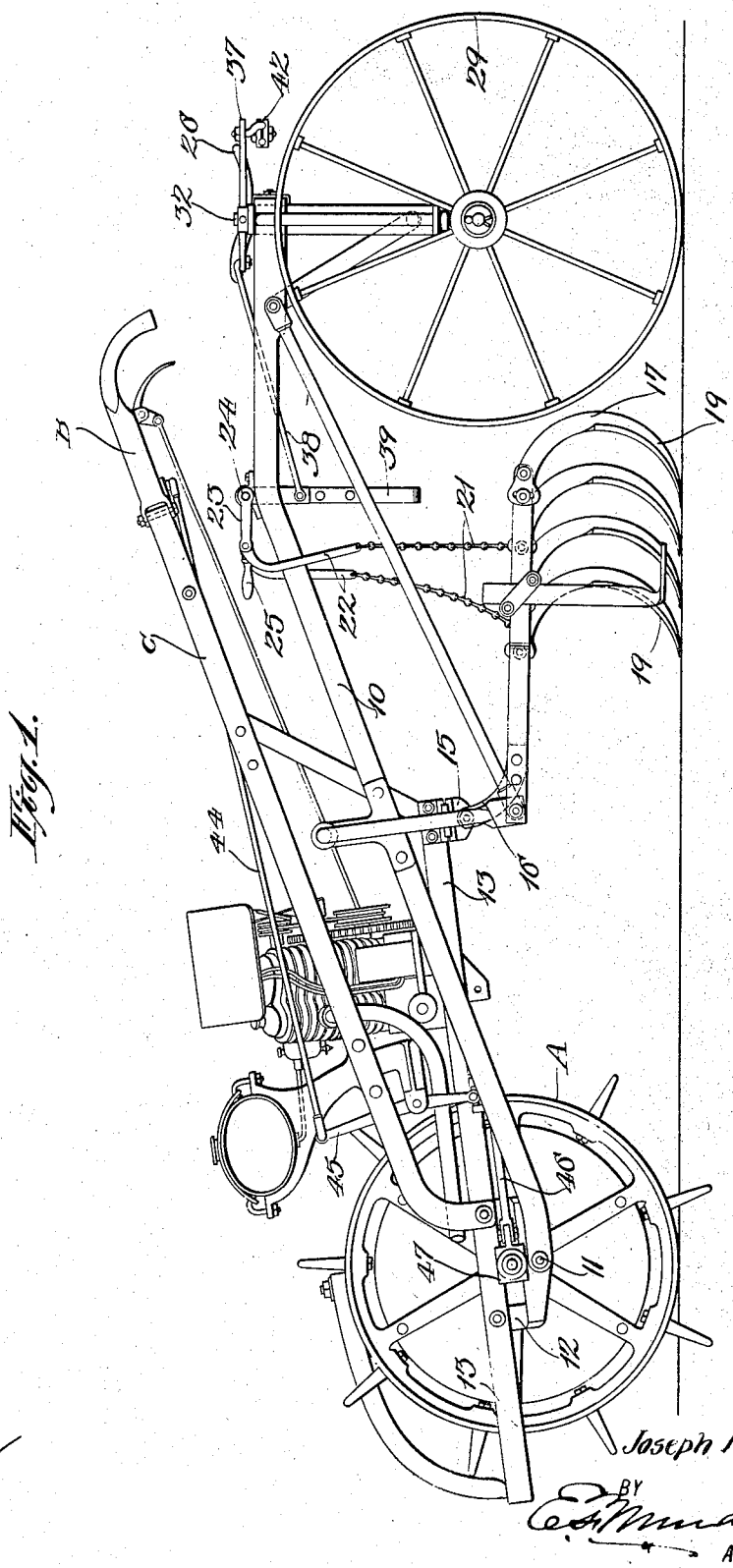

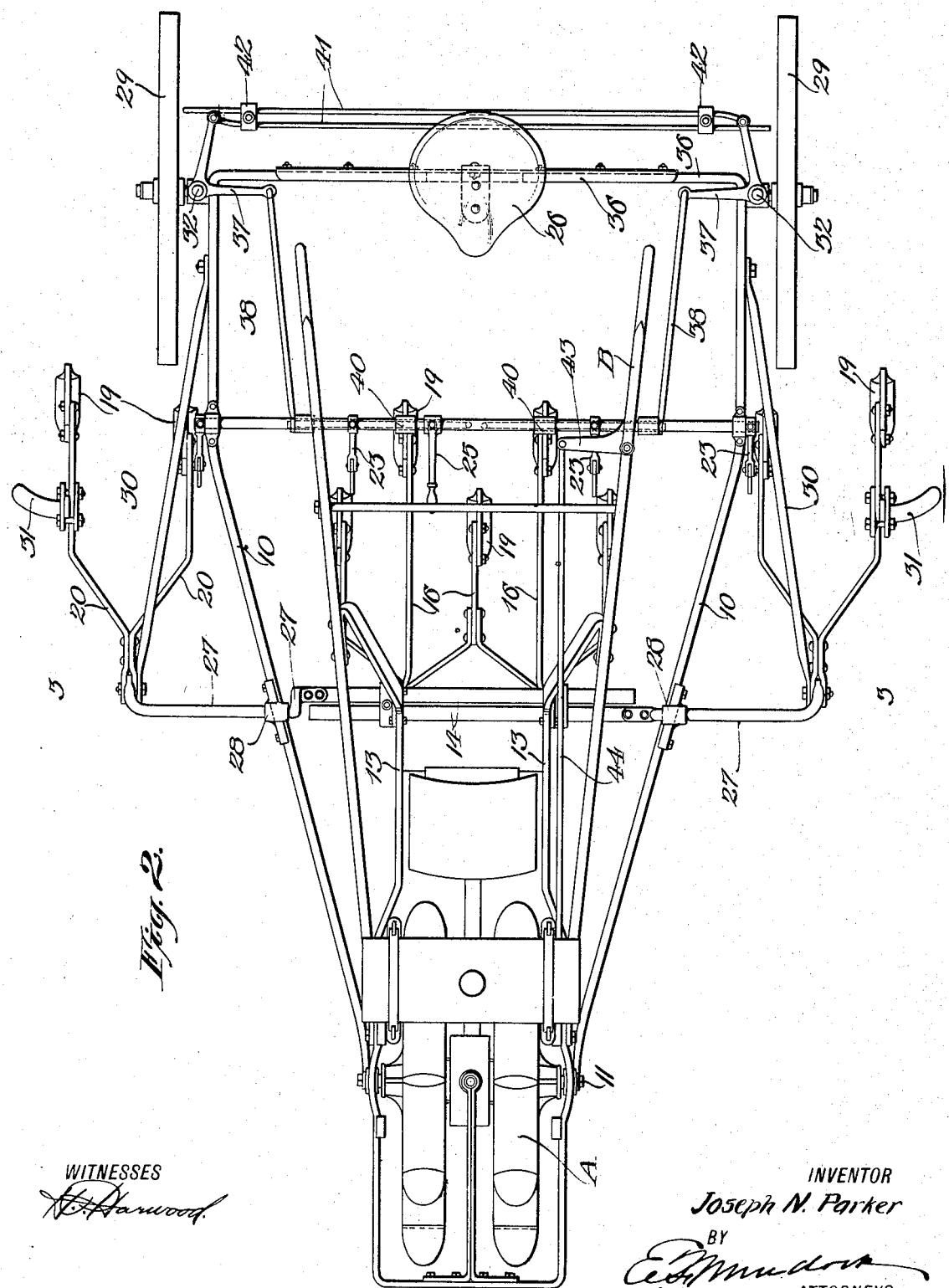

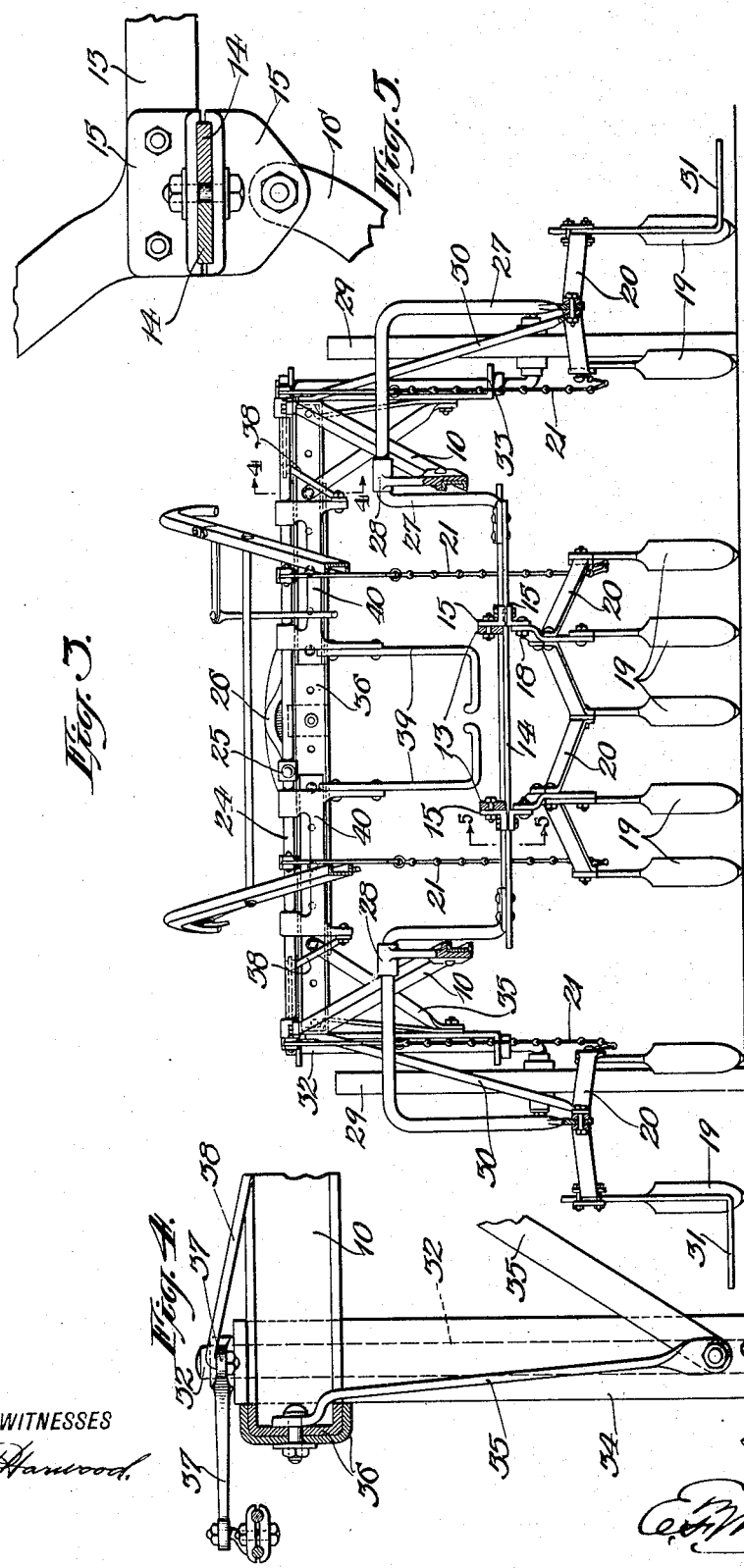

1,513,560

UNITED STATES PATENT OFFICE.

JOSEPH N. PARKER, OF BEDFORD CITY, VIRGINIA.

RIDING-SULKY TRACTOR IMPLEMENT.

Application filed September 1, 1920. Serial No. 407,335.

*To all whom it may concern:*

Be it known that I, JOSEPH N. PARKER, a citizen of the United States, and a resident of Bedford City, in the county of Bedford and State of Virginia, have invented certain new and useful Improvements in Riding-Sulky Tractor Implements, of which the following is a full, clear, and exact description.

Among the principal objects which the present invention has in view are: to provide means for independently steering the tractor and sulky elements of the implement; to attach various cultivating tools to said implement; to vary the working condition of said tools; to vary the spread of the sulky in correspondence with the operating conditions thereof; and to expand and contract the operating disposition of the tools supported by said implement.

*Drawings.*

Figure 1 is a side elevation of an implement constructed and arranged in accordance with the present invention;

Figure 2 is a plan view of the same;

Figure 3 is a cross section taken on the line 3—3 in Figure 2;

Figure 4 is a detail view on enlarged scale, showing a section of the expansion bars of the frames, and of the spreader rods for truing the steering knuckles of the carrying wheels, the section being taken as on the line 4—4 in Figure 3;

Figure 5 is a detail view on enlarged scale, in section of the forward spreading bars of the frame, the section being taken as on the line 5—5 in Figure 3.

*Description.*

As seen in the drawings, the side bars 10 of the sulky are supported at the forward ends by bolts 11, which extend through the dropped frame 12 of the tractor frame 13. The tractor mechanism mounted in and on the frame 13 carried thereby is disclosed more fully in an application filed by me for improvements in traction plows, on the 3rd day of May, 1920, which application bears Serial Number 378,563, and to which application cross reference is here made.

The side bars 13 are supported on the side bars 10 of the sulky frame, and upon the tool bars 14 by means of clip irons 15, shown best in Figure 5 of the drawings. The clip irons 15 are arranged in pairs, to the lower members of which the beams 16 of the cultivator 17 shown in the drawings are pivotally connected by bolts 18. As shown best in Figure 3 of the drawings, the cultivators have a series of spades 19 arranged in any suitable manner, and in correspondence with the disposition of the rows of plants being cultivated. The frames 20 on which the spades are mounted are elevated at the rear by chains 21, when occasion dictates, the said chains being attached by links 22 to the ends of lifting arms 23. The arms 23 are rigid on the tubular shaft 24, which extends across the sulky frame, and is provided about midway thereof with a hand lever 25. The hand lever 25 is convenient to the rider's seat 26, so that he can reach forward and, by engaging and lifting the said lever upward and backward, cause the arms 23 to be likewise affected, with the result that the spades 19 are removed from the earth in which they are working. The extremities of the shaft 24 telescope within the median portion thereof, to accommodate the expansion of the side bars 10 of the frame when adding more or subtracting from the number of spades employed or when increasing the spaced relation of said spades.

The forward bar 14 is supported on the side bars 10 by the inner extensions of outriggers 27, as seen best in Figure 3 of the drawings. The outriggers are in turn supported in service by the brackets 28. The outer extensions of the outriggers 27 are pivotally attached to outer cultivator frames, which in service operate directly in front of the sulky carrying wheels 29. The outer ends of each outrigger 27 is braced by a brace rod 30. It is preferred to furnish the outer extremity of the frames 20 attached to the outriggers with a stubble or weed layer 31.

The wheels 29 are mounted on journals formed by out-turning the lower extremities of vertical knuckle bars 32. The bars 32 are mounted in bearings formed by offsets 33 at the lower end of plates 34, which are bolted rigidly to the side bars 10, and reinforced by braces 35, which connect the said plates 34, side bars 10 and the lapped back bars 36, to maintain the said plates in their upright position.

The wheels 29 are guided by the bell cranks 37, shown best in Figure 2 of the drawings, as mounted rigidly on the bars 32, and at the upper ends thereof. The transversely extended arms of the bell cranks 37 are individually connected by thrust rods 38 with pending stirrup levers 39. As shown best in Figure 3 of the drawings, the levers 39 are rigidly attached to swinging frames 40, while the rods 38 are pivotally connected therewith. The frames 40 are independent and are free to rock on the shaft 24. Uniformity in the cutting of the wheels 29 is, however, secured by connecting the bell cranks 37 and the rearward lengthwise extensions thereof by means of the adjustable reach bars 41. The bars 41, as best shown in Figure 2 of the drawings, are held rigidly in adjusted position by means of clips 42.

The stirrups 39 are manipulated by the rider to cut the wheels 29 to any angle to the progress of the line of movement of the implement. As described in the application above referred to, the tractor wheels A of the tractor mechanism are cut or swung on a self-contained center by moving the handle B of the hand bars C of the said tractor mechanism. To this end the handle B is provided with an offset bracket arm 43, the end of which is attached to the connecting rod 44 which in turn rocks the rocking lever 45, the lower end of which is connected by a short rod 46 to the bearing post 47 of the tractor wheel A.

It is obvious that when an operator is seated on the sulky frame he may at will, by swinging the handle B and the stirrup levers 39, cut the tractor wheels A to follow one path and the sulky wheels 29 to follow another. The double steering effect thus provided in the implement permits the adjustment of the frame so that the furrows may be cut or made extending in perpendicular relation to each other, a result much sought by users of agricultural implements. Also it will be seen that the operator may easily engage the lever 25 to rock the shafts 24 for lifting the cultivators 17 out of their operative position. The implement is thus fully in the control of the operator.

It will be understood that the spading cultivator shown in the drawings may be replaced by other forms of cultivators, such as the rolling disk cultivator, or that the character of tool may be varied. Also it will be seen that by laterally adjusting the tool bars 14 and pins 36 the spread of the sulky may be altered to suit the character of the work which is contemplated. When the frame is thus spread the rods 41 must be released by loosening the clips 42 to permit the said rods to accommodate themselves to the adjustment of the frames.

Claim.

An implement of the character described comprising a frame having forwardly converging side bars, a tractor disposed between the converged ends thereof, a frame for said tractor, supporting connection from said side bars to said tractor frame at the rear end thereof, the rear end of said tractor frame being arranged, with said supporting connection, to form a transverse connection between said side bars, rearwardly disposed transverse connecting bars between said side bars, carrying wheels at the rear of said frame, steering mechanism therefor journalled on one of said transverse connecting bars, all of said transverse connecting members being adjustable for varying the spread of said frame, and tractor steering mechanism independent of said carrying wheel steering mechanism, and supported above said frame.

JOSEPH N. PARKER.